(12) United States Patent
Campbell

(10) Patent No.: US 7,892,634 B2
(45) Date of Patent: Feb. 22, 2011

(54) 3-D RELIEF PATTERN BLANK AND METHOD OF USING

(76) Inventor: Keith C. Campbell, 10239 Parkwood Dr., Kensington, MD (US) 20895

( * ) Notice: Subject to any disclaimer, the term of this patent is extended or adjusted under 35 U.S.C. 154(b) by 937 days.

(21) Appl. No.: 11/806,228

(22) Filed: May 30, 2007

(65) Prior Publication Data

US 2007/0292807 A1    Dec. 20, 2007

Related U.S. Application Data

(60) Provisional application No. 60/814,306, filed on Jun. 16, 2006.

(51) Int. Cl.
*B32B 3/26* (2006.01)
*B32B 9/00* (2006.01)
*B32B 27/00* (2006.01)
(52) U.S. Cl. ............... 428/304.4; 428/318.4; 428/319.7
(58) Field of Classification Search ............... 428/304.4, 428/318.4, 319.7
See application file for complete search history.

(56) References Cited

U.S. PATENT DOCUMENTS

| | | | |
|---|---|---|---|
| 3,425,882 A * | 2/1969 | Adams et al. ................. | 156/82 |
| 3,535,144 A * | 10/1970 | Rieke et al. .................. | 427/557 |
| 3,742,853 A | 7/1973 | Landsman | |
| 3,779,779 A | 12/1973 | Landsman | |
| 3,832,948 A | 9/1974 | Barker | |
| 3,836,624 A | 9/1974 | Ferris | |
| 3,864,143 A | 2/1975 | Fantazier et al. | |
| 3,949,028 A | 4/1976 | Murakami et al. | |
| 3,999,918 A | 12/1976 | Landsman | |
| 4,117,181 A | 9/1978 | Minami et al. | |
| 4,139,409 A | 2/1979 | Macken et al. | |
| 4,268,615 A | 5/1981 | Yonezawa | |
| 4,414,059 A | 11/1983 | Blum et al. | |
| 4,417,948 A | 11/1983 | Mayne-Banton et al. | |

(Continued)

FOREIGN PATENT DOCUMENTS

EP        0 997 31 3        5/2000

(Continued)

OTHER PUBLICATIONS

"Applications for Synrads CO2 Laser Technology", http://www.synad.com/newsletter/0305-2.htm First retrieved on Apr. 18, 2006.

*Primary Examiner*—Victor S Chang
(74) *Attorney, Agent, or Firm*—Richard C. Litman

(57) ABSTRACT

The 3-D relief pattern blank and method of using comprises the steps of using a cutting machine to cut a thin, retroreflective heat reflective sheet in a desired pattern. The thin, retroreflective heat reflective sheet is formed to provide a heat-retroreflective mask. Subsequently, the heat-retroreflective mask is transferred to a preferably smooth surface of a foamed thermoplastic substrate. The assembly of heat-retroreflective mask and foamed thermoplastic is then exposed to a source of visible and/or infrared radiation. The radiation does not have to be coherent and the exposure need not be under automatic guidance or control. Unmasked areas of the foamed thermoplastic absorb radiant heat more rapidly than masked areas, causing the unmasked areas to collapse into a relief of the desired pattern. The resulting relief ranges between approximately an eighth of an inch and one inch in depth.

17 Claims, 7 Drawing Sheets

U.S. PATENT DOCUMENTS

| | | |
|---|---|---|
| 4,578,329 A | 3/1986 | Holsappel |
| 4,769,257 A | 9/1988 | Duley et al. |
| 4,933,205 A | 6/1990 | Duley et al. |
| 5,857,410 A | 1/1999 | Watanabe et al. |
| 6,142,071 A | 11/2000 | Fexer |
| 6,806,018 B2 | 10/2004 | Kanga et al. |
| 2003/0075059 A1 | 4/2003 | Mori |
| 2004/0089172 A1 | 5/2004 | Nakamura et al. |

FOREIGN PATENT DOCUMENTS

| | | |
|---|---|---|
| GB | 2 105 257 | 3/1983 |
| JP | 1-114423 | 5/1989 |

\* cited by examiner

3-D RELIEF PATTERN BLANK AND METHOD OF USING

CROSS-REFERENCE TO RELATED APPLICATION

This application claims the benefit of U.S. Provisional Patent Application Ser. No. 60/814,306, filed Jun. 16, 2006.

BACKGROUND OF THE INVENTION

1. Field of the Invention

The present invention relates to the mold-less forming of patterns in relief on foamed thermoplastic material, and more particularly to the forming of a 3-D relief pattern on foam plastic material by the application of radiant heat energy to the foam plastic material.

2. Description of the Related Art

Common methods of producing large dimensional signs include routing, sandblasting, vacuum-forming, pressure molding, and hot-die forming. These methods have many drawbacks. Vacuum-forming, pressure-molding, and hot-die forming require the construction of dies, which can be costly and time-consuming to produce. Routing and sand-blasting do not require molds or dies, but have their own drawbacks. Routing is labor intensive if manual, and requires specialized tool-path programming if automated. Both sandblasting and routing generate noise and dust. Sandblasting in particular uses silica sands that can pose a serious health hazard, and therefore requires special safety equipment. Methods of forming relief patterns in foam using radiant energy eliminate the problems of sandblasting, routing, or the like, and may be divided into methods based on laser ablation, methods based on differential expansion in foam, and methods based on differential collapse in foam.

It would be desirable, therefore, to have a method forming relief patterns in foam using radiant energy that is capable of producing dimensional signage of at least several feet in length and width, while requiring neither special dies nor expensive specialized equipment, nor producing noise and dust. A method with the qualities described would be likely to have additional applications in other industries involving fabrication of items in relief, such as architectural decor and novelty items.

Thus, a 3-D relief pattern blank and method of using solving the aforementioned problems is desired.

SUMMARY OF THE INVENTION

The 3-D relief pattern blank and method of using replicates a two-dimensional pattern in relief in a heat-collapsible foam plastic substrate having a heat-absorbent smooth surface and comprises the steps of using a cutting machine to cut a thin, retroreflective heat reflective sheet in a desired pattern. Retroreflective materials are characterized by the ability to redirect light incident on the material back toward the originating light source, and therefore have the most suitable heat reflecting properties required according to the present invention. The thin, heat retroreflective sheet is formed to provide a heat-retroreflective mask. Subsequently, the heat-retroreflective mask is transferred to a preferably smooth surface of the foamed thermoplastic substrate. The assembly of heat-retroreflective mask and foamed thermoplastic forms a 3-D relief pattern blank which can be exposed to a source of visible and/or infrared radiation. Because of the retroreflective nature of the mask, the radiation does not have to be coherent and the exposure need not be under automatic guidance or control. Moreover, due to the retroreflective nature of the mask, masked areas are uniformly and reliably kept cool relative to the unmasked areas so that the unmasked areas of the foamed thermoplastic absorb radiant heat substantially more rapidly than masked areas, resulting in the unmasked areas collapsing into a relief of the desired pattern in a reasonably short time. Because of the substantial radiation absorption difference between unmasked and masked areas, the resulting relief can range between approximately an eighth of an inch and one inch in depth.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1A:
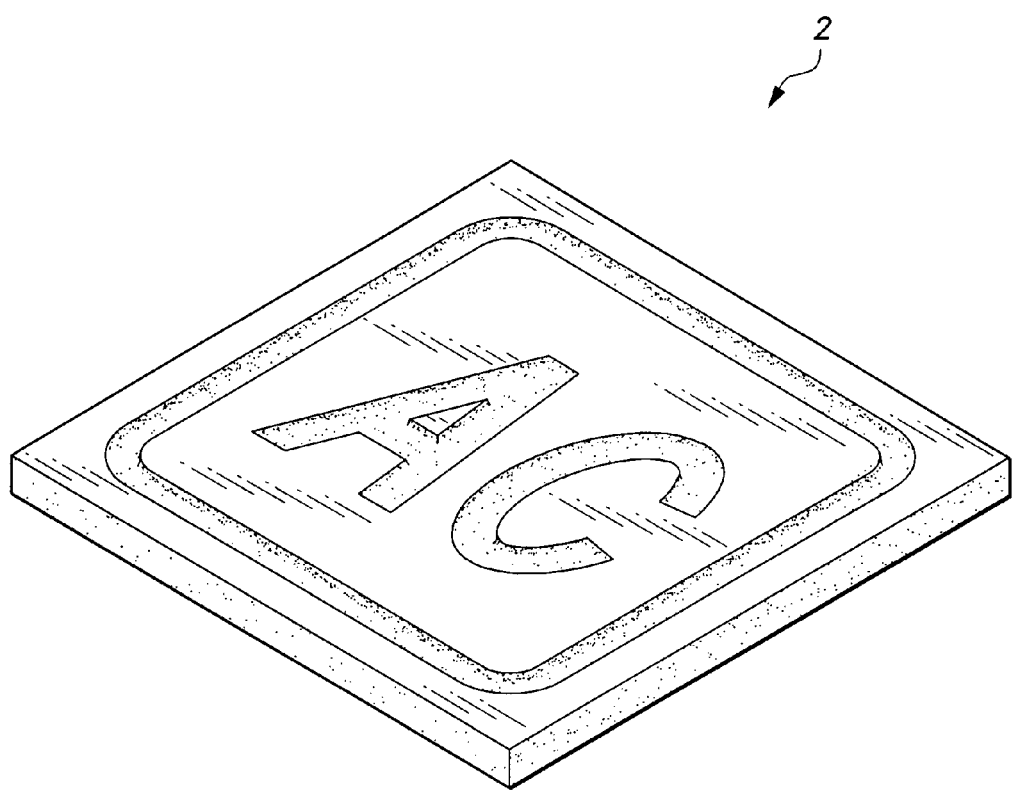
FIG. 1A is an environmental, perspective view of a relief figure produced by the 3-D relief pattern forming method according to the present invention.
Figure 1B:
FIG. 1B is a first cross section view of a heat-collapsible foam plastic substrate with a smooth, heat-absorbing surface, showing a first form of the smooth surface according to the present invention.
Figure 1C:
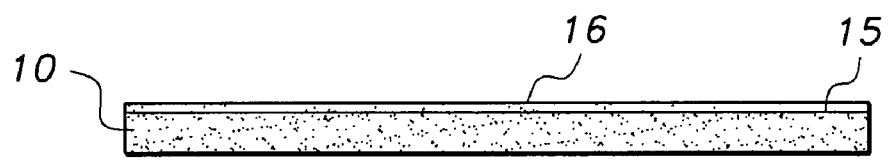
FIG. 1C is a second cross section view of a heat-collapsible foam plastic substrate with a smooth, heat-absorbing surface, showing a second form of the smooth surface according to the present invention.
Figure 1D:
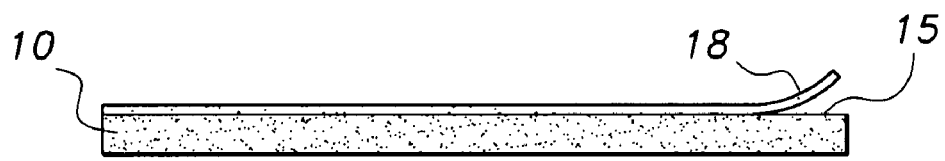
FIG. 1D is a third cross section view of a heat-collapsible foam plastic substrate with a smooth, heat-absorbing surface, showing a third form of the smooth surface according to the present invention.
Figure 2:
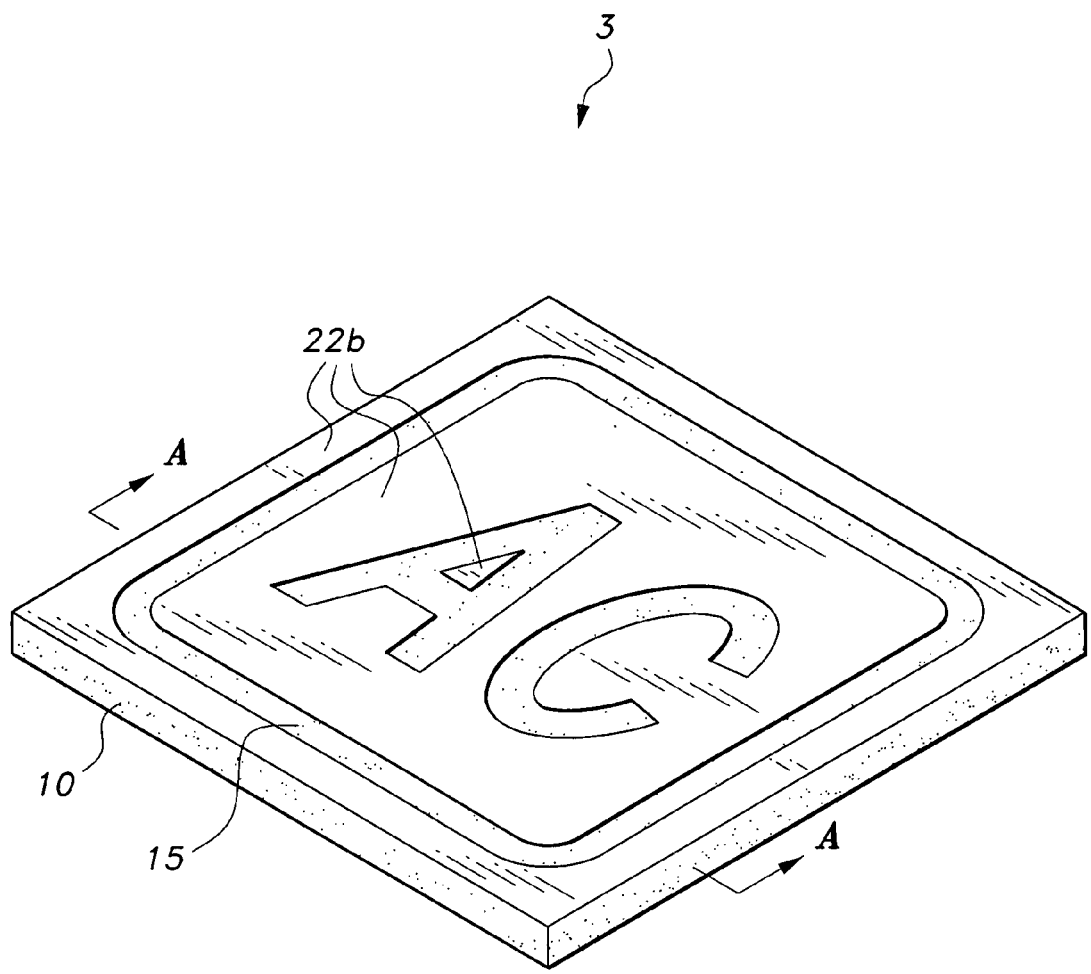
FIG. 2 is a perspective view of a heat-collapsible foam plastic substrate with a smooth heat absorbing surface to which is applied a reflective film mask, according to the present invention.

As shown in FIGS. 1A through 2, the present invention includes a 3-D relief pattern blank 3 capable of replicating a two-dimensional pattern in relief in a heat-collapsible foam plastic substrate to create a relief patterned foam sign 2. The method used to create the 3-D relief pattern in the foam substrate includes the step of cutting (preferably with a cutting machine) a thin heat retroreflective sheet in a desired pattern. Retroreflective materials are characterized by the ability to redirect light/radiant energy incident on the material back toward the originating light/radiant energy source, and therefore have the most suitable heat reflecting properties required according to the present invention. The present invention contemplates the usage of microsphere-based sheeting, cube corner sheeting, or any other type of retroreflective sheeting material which can be formed to provide a radiant energy/heat-retroreflective mask. Once formed into a desired pattern, the heat-retroreflective mask is transferred to a preferably smooth surface of the foamed thermoplastic substrate. The assembly of heat-retroreflective mask and foamed thermoplastic forms a 3-D relief pattern blank which can be exposed to a source of visible and/or infrared radiation. Because of the retroreflective nature of the mask, the radiation does not have to be coherent and the exposure need not be under automatic guidance or control. Moreover, due to the retroreflective nature of the mask, masked areas are uniformly and reliable kept cool relative to the unmasked areas so that the unmasked areas of the foamed thermoplastic absorb radiant heat substantially more rapidly than masked areas, resulting in the unmasked areas collapsing into a relief of the desired pattern in a reasonably short time. The resulting relief can range between approximately an eighth of an inch and one inch in depth.

Referring to FIG. 1B-D, a heat-collapsible foam plastic substrate 10 has a smooth, radiant heat absorbing surface 15 large enough to accommodate the pattern to be replicated. Desirable characteristics of the foam plastic substrate 10 include a fine and uniform cell structure, a low melting point, and a moderate to low viscosity when heated. A fine and uniform cell structure allows more precise replication of the pattern. A low melting point makes the foam plastic more susceptible to collapse.

While polyethylene foams may be used, a variety of polystyrene and polyolefin foams are preferably used according to the present invention, however the discussion below of specific brands of foam is in no way to be taken as a limitation on the type of foam that can be used by the present invention. Among polystyrene foams, Dow® Styrofoam® blue extruded polystyrene in several grades, and Alcan® Gatorblanks® in one-inch thick extruded polystyrene in white work especially well according to the present invention. Among the polyolefin foams, both black and white grades of Propozote® polypropylene foam from Zotefoams PLC can produce especially high quality results. Some polyolefin blends can produce relief structures of moderately good quality.

Smooth, radiant energy/heat absorbing surface 15 of foam plastic substrate 10 may be naturally radiant energy/heat absorbing, as shown in FIG. 1B, and/or may be provided with energy/heat absorbing enhancements such as the alternatives shown in FIGS. 1C, and 1D. As shown in FIG. 1B, the surface 15 has no enhancements and will typically have good energy absorbing characteristics as manufactured if the plastic foam substrate 10 is manufactured in a dark color, such as for example, black or charcoal.

Otherwise, a coating can to be applied to foam plastic substrate 10 that will absorb radiant energy while allowing the foam to collapse freely. In addition to absorbing radiant heat, preferably the coating is capable of conforming to the surface of foam plastic substrate 10 as it collapses. Additionally, the coating preferably has the capability to maintain a smooth and even surface texture following the formation of the relief structure.

In FIG. 1C, a permanent coating 16 is disposed on the foam surface 15 to provide additional radiant heat absorption. A variety of opaque paints can provide the required heat absorption. Latex paints, for example, have been found to work well. While black is an excellent color choice for maximizing radiant heat absorption, other deep colors can also provide sufficient radiant heat absorption to enable collapse in some types of foam, and may be preferable for decorative reasons. If desired, a primer or sealing coat may be applied to the foam surface prior to application of the heat absorbing final coat to improve the surface quality or adhesion characteristics of the foam surface without adversely affecting formation of the relief structure.

As an alternative to a permanent heat absorbing coating 16, a removable heat absorbing coating 18 may be applied, as shown in FIG. 1D. Such a coating may be useful in cases where it is desired that the appearance of the relief structure match the appearance of surrounding areas of uncoated foam. It may also have special value when applied to the surface of translucent foam substrates in order to preserve said translucency in a finished relief structure. Translucency has great value in sign-making, because it allows the manufacture of illuminated signage that remains readable at night.

Removable heat absorbing coating 18 may itself be constructed from several layers of material. For example, coating 18 may be comprised of a thin plastic film capable of conforming to the foam as the foam collapses, maintaining its integrity as the relief structure is formed, and peeling away from the relief structure without difficulty. The thin plastic film 18 can be temporarily adhered to the surface of the foam plastic substrate 10 and may be coated with a dark paint to provide the required radiant energy/heat absorbing characteristics. Dow® Styrofoam® ½" and ¾" extruded polystyrene sheets bear a thin plastic film having the required characteristics.

A second means of providing a removable heat absorbing coating 18 is to apply a liquid which cures into a coating that may be peeled or washed away following formation of a relief structure. Because the foam substrate 10 releases a quantity of gas as it collapses, a liquid coating requires a suitable combination of adequate adhesion to foam substrate 10 and some level of permeability in order to prevent the released gas from forming bubbles in the coating as the foam collapses, because such bubbles can affect the quality of the resulting relief structure. Water-soluble paint mixer and water-soluble polyvinyl acetate (PVA) glues have been used successfully to create a washable coating. A dark tinting agent, such as, e.g., paint is preferably mixed with the PVA glue. Preferably, a PVA glue may be applied to a foam substrate 10 of extruded polypropylene. When creating a removable coating 18 using the liquid method, preferably the surface of the foam is sealed first in order to increase the smoothness of the foam surface and facilitate later removal of the removable coating.

Referring to FIG. 2, the 3-D relief pattern blank assembly 3 comprises a foam plastic substrate 10 having a preferably smooth and heat absorbent surface 15 to which is adhered a radiant energy/heat retroreflective mask 22b made from retroreflective film 35. The suitably retroreflective film 35 must prevent transmission of heat from the radiant heat source to the foam plastic substrate 10 in masked areas. Advantageously, the retroreflective film 35 reflects the radiation back to the source to thereby insulate the foam from the heat in a consistent and uniform manner. The retroreflective film 35 preferably maintains its own integrity when exposed to radiant heat, so that it does not melt, bubble or curl. The retroreflective film 35 used in the present invention advantageously includes a sufficiently strong adhesive binding to the film 35 to avoid failure of adhesive contact with the film substrate. Moreover the film 35 does not deform under exposure to the radiant energy required to collapse unmasked portions of the foam.

Figure 3:
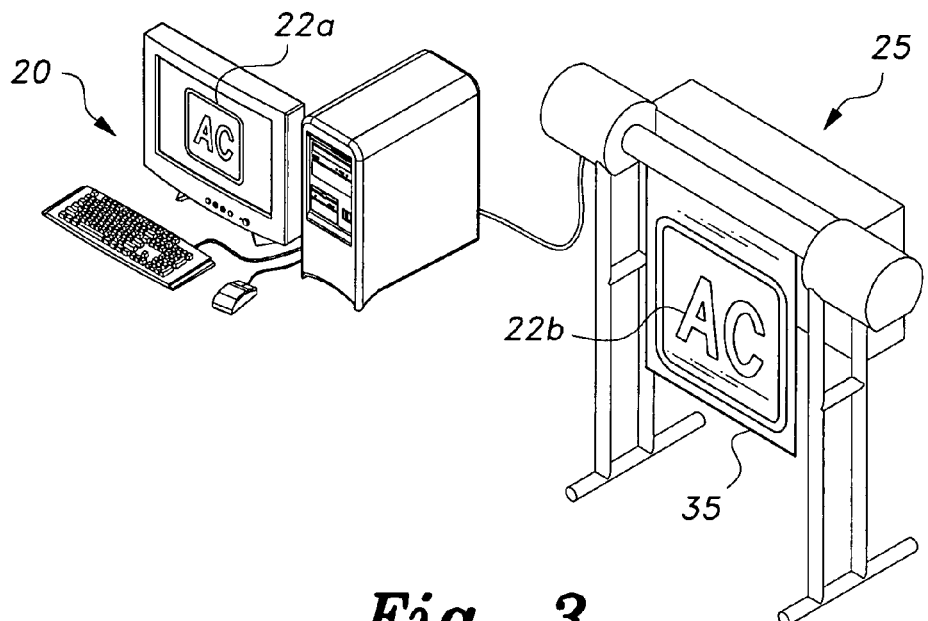
FIG. 3 is a diagrammatic view of a computer controlling a cutting-plotter to cut a thin reflective film into a two-dimensional pattern according to the present invention.

As shown in FIG. 3, a retroreflective film 35 may also be used in a cutting plotter 25 controlled by computer 20 executing programmed instructions to create mask 22b of pattern 22a. The mask 22b retains all material properties of the retroreflective film 35. Retroreflective films 35 are thicker and stiffer than the vinyl films most commonly used in cutting-plotters, and reflect back to the radiation source a high proportion of the visible and infrared radiation directed at them. Both 3M® Scotchlite® reflective films and Avery® A7™ series reflective films have been used with good success. These films are thin, flexible, retroreflective, and sold in rolls with standard widths up to 48". Furthermore, multiple strips of the film may be tiled if necessary to produce heat-retroreflective masks many feet in length and width.

The mask 22b of retroreflective film 35 can serve not just as a resist to the radiant heat energy, but also as a decorative finish. Although light-colored retroreflective films possess the greatest ability to reflect radiant heat, it has been found that retroreflective films in a variety of colors can serve as effective masks, providing a range of decorative possibilities.

Computer-driven cutting plotters provide one convenient means of cutting a retroreflective film 35 into a mask of a desired pattern. Referring to FIG. 3, a retroreflective mask 22b is cut to pattern 22a using computer 20 to drive cutting plotter 25, which cuts a roll of retroreflective film 35. The process of creating and cutting a pattern such as pattern 22a in films using a computer-driven cutting plotter 25, and transferring the cut film to a substrate is widely used within the sign industry today and is believed to be well known and need not be described further. An advantageous feature of the present invention, however is that a retroreflective film 35 is used to create the mask 22b.

While computer-driven cutting plotters provide a convenient and broadly used means of cutting reflective films in the making of signs, the present invention contemplates other cutting means such as manual cutting, laser-cutting, water-jet cutting, die-cutting, etc. which may be preferable in some applications.

Figure 4:
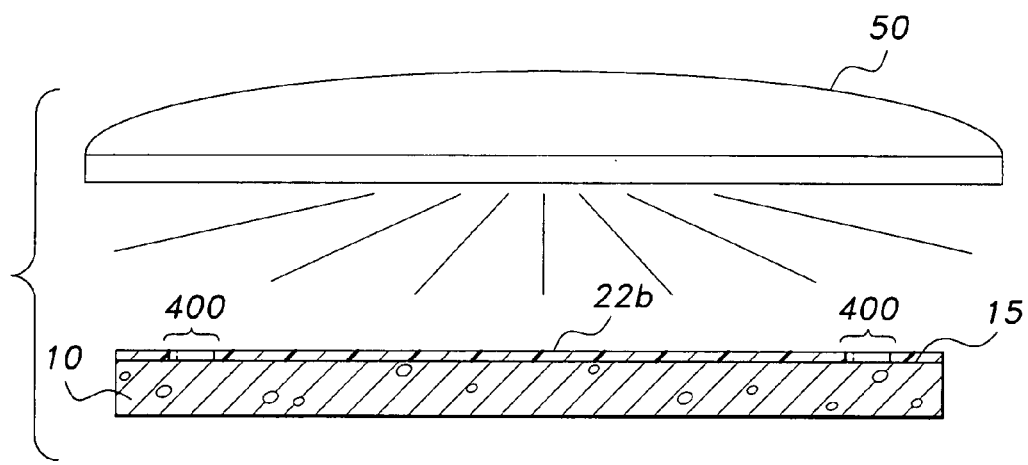
FIG. 4 is a cross section view on line A-A of FIG. 2 of the exposure of a mask-bearing foam plastic surface to a suitable source of visible and/or infrared radiation according to the present invention.

To form the dimensional relief embodying the two-dimensional surface pattern, the assembly of retroreflective mask 22b and foam substrate 10 is placed under a radiant heat source and allowed to heat until exposed areas of the foam 10 collapse. FIG. 4 shows a cross-section view of the assembly along the line A-A of FIG. 2 where a foam plastic substrate 10 having a smooth and heat absorbent surface 15 to which is adhered a mask 22b made from retroreflective film 35, the assembly being exposed to a source of visible and/or infrared radiation 50. Gaps 400 in the mask 22b allow direct exposure of radiation 50 to the substrate surface 15.

Because of the excellent heat-retroreflective qualities of retroreflective film mask 22b, it has been found that inexpensive and widely available lamps can produce good quality relief structures. Even a 250 Watt incandescent heat lamp can produce a relief structure of moderately good quality. However, a rod-type halogen T-3 lamp mounted in flood-light fixtures has proven particularly suitable as radiant heat source 50.

Such a lamp economically provides relatively good uniformity of exposure and produces much of its radiant energy in the desirable far-visible and near-infrared portion of the spectrum. These lamps have performed particularly well when allowed several minutes to pre-heat. A 120 volt 1,000 Watt halogen T-3 flood-light fixture with matching lamp can be used with good success. However, increased precision could undoubtedly be obtained using fixtures and radiant energy sources engineered specifically for the type of use contemplated by the present invention.

Depth of relief can be controlled by varying the length and intensity of exposure, but each foam plastic material has a 'natural' depth that lends itself to a high-quality relief, because the material tends to form a smooth relief floor at that depth. In the material grades tested, the natural depth has been found to range between 0.125" and 0.5". Greater depth of relief can be achieved, hut requires more precise control of the exposure.

When forming relief patterns to the 'natural' depth, manual control of the foam is adequate for producing a good quality relief structure. To form the relief structure, the heat source 50 is adjusted to a desired height above the foam plastic substrate 10, switched on, and allowed to pre-heat for several minutes. The assembly 3 which comprises foam plastic substrate 10 and heat reflective mask 22b is then moved around slowly under the light, maintaining a uniform distance between the assembly 3 and the radiant heat source 50 in the area of maximum exposure, and using visual feedback to guide the assembly 3 in such a way as to cause a relatively uniform depth of relief. When the plastic foam substrate 10 has the form of a flat sheet or plank, a flat smooth work surface is a useful aid for maintaining roughly uniform distance between the assembly 3 and radiant heat source 50. In that case, the assembly 3 of foam 10 and heat-retroreflective mask 22b is placed on a smooth work surface and slid over the work surface during exposure. When the plastic foam substrate 10 has some other form, other aids may prove helpful. For example, a taut string run parallel to the light fixture 50 at the desired distance from radiant heat source 50 can provide a useful visual reference during exposure.

It should be noted that while no burning of foam occurs during the process when properly conducted, some out-gassing does occur as portions of the foam collapse, so adequate means of ventilation and filtering should be provided.

In practice, distances between a 1000 Watt halogen T-3 lamp and foam work-piece of approximately 11" for expanded polystyrene, 9" for non-cross-linked polyethylene, and 8" for extruded polypropylene foams have been found to yield a reasonable combination of good quality relief and rapid formation of the relief structure. Due to the differences in melting point and structure, polystyrene foams collapse most quickly, and polypropylene foams collapse most slowly. A representative time required to form a 16"×20" relief pattern is between one and two minutes.

Figure 5:
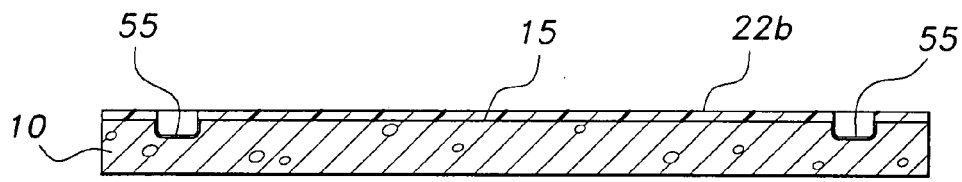
FIG. 5 is a cross section view on line A-A of FIG. 2 of a relief structure formed by the image-wise collapse of foam plastic in unmasked areas according to the present invention.

FIG. 5 illustrates in a cross section view of line A-A in FIG. 2 the form of relief structure 55 produced. Areas of the foam plastic substrate 10 covered by mask 22b of reflective film 35 remain un-collapsed. Other areas collapse into a relief with rounded bottom edges, similar to the form of sand-blasted relief structures. The depth of the relief floor varies smoothly, and is relatively uniform in broad unmasked areas. In narrow unmasked areas, the depth of relief is reduced.

Figure 6:
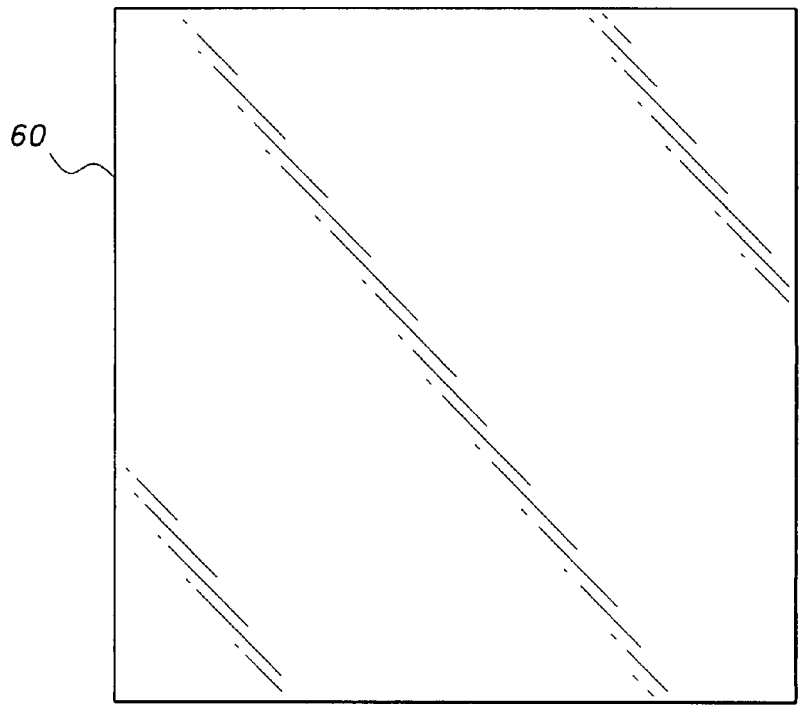
FIG. 6 is a top plan view of a thin sheet of an effectively transparent material according to the present invention.
Figure 7:
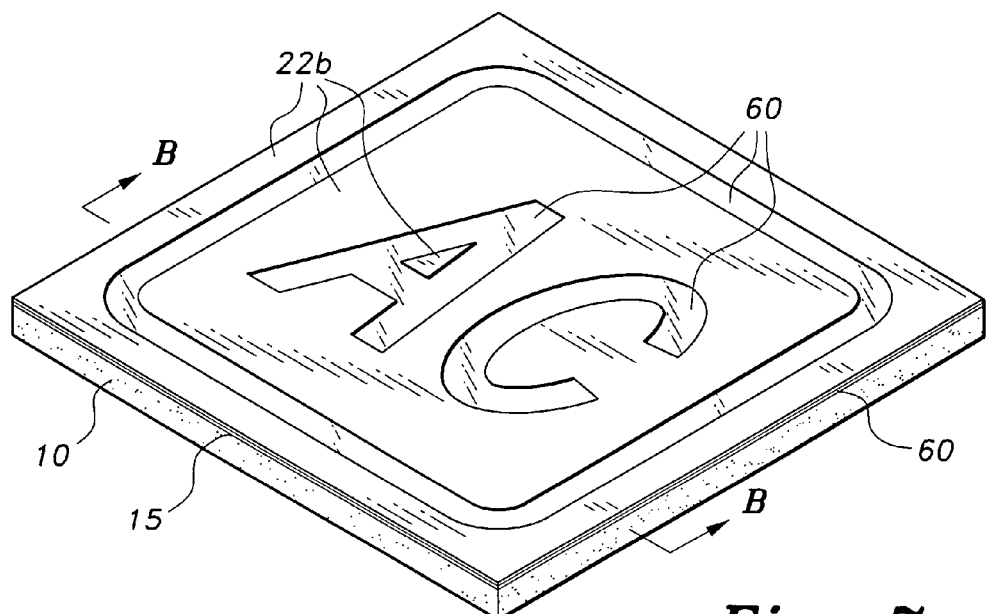
FIG. 7 is a perspective view of a sheet of effectively transparent material and heat retroreflective film mask disposed over foam according to the present invention.
Figure 8:
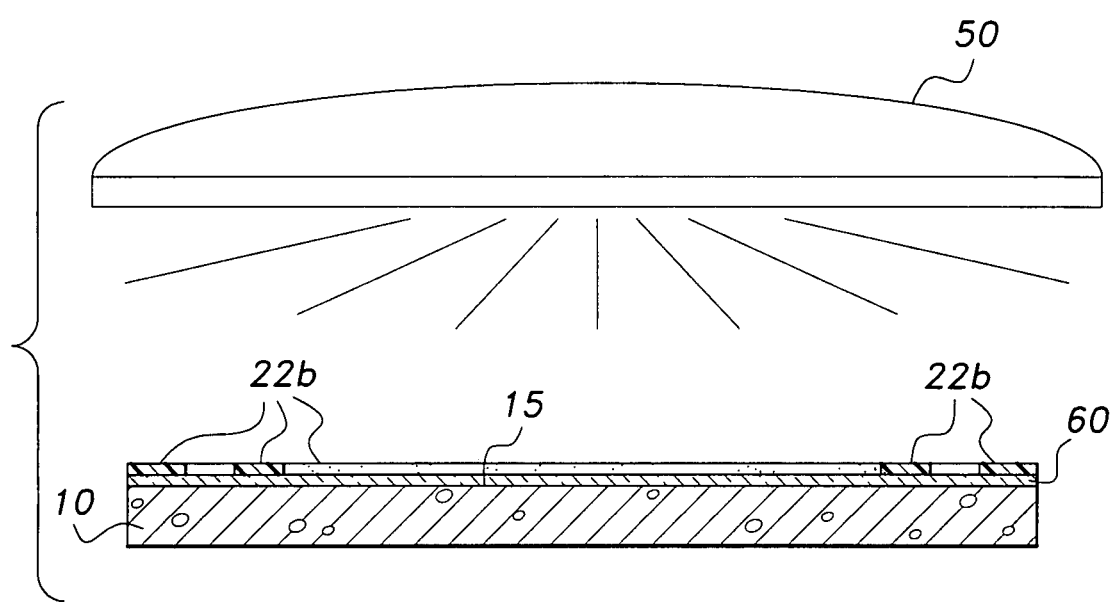
FIG. 8 is a cross section view on line B-B of FIG. 7 of the exposure of an assembly of mask-bearing effectively transparent material and foam surface to a suitable source of visible or infrared radiation according to the present invention.

As shown in FIGS. 6-8, the retroreflective film mask 22b can be transferred on to a thin sheet of a substantially transparent material rather than directly onto the foam substrate 10, the assembly of retroreflective film mask and transparent material then being placed over the smooth foam surface 15 prior to exposure. The material must be transparent in order to preserve the transfer quality of the pattern 22a via mask 22b. A principle advantage of this variation is that the assembly of mask 22b and effectively transparent material can be re-used to produce multiple copies of a pattern 22a, making the approach more suitable for volume production. By effectively transparent is meant that the material is substantially transparent at least with respect to the passage of radiant heat energy.

FIG. 6 depicts a sheet of effectively transparent material 60 in top plan view. In addition to being effectively transparent, a suitable material must allow passage of gases that escape as portions of the foam substrate 10 collapse into a relief structure, while providing a secure base for the reflective film mask 22b that prevents curling or other adhesion problems. Fiberglass tissue has been found to provide the necessary characteristics. As shown in FIGS. 7-8, the assembly of heat-retroreflective mask 22b from film 35 and effectively transparent material 60 can then be placed on the smooth surface 15 of the foam substrate 10. The combination of transparent material 60 and reflective film mask 22b are applied to smooth surface 15 of foam substrate 10 in cross section along line B-B of FIG. 7. As shown in FIG. 8, the whole is exposed to a source of visible and/or infrared light 50 to create a pattern-wise relief in foam substrate 10. The reflective film mask 22b must be maintained in close proximity to the foam 10 while the transparent material 60 must be prevented from sticking to the heated foam substrate 10. Sticking has not been found to be a problem when forming polystyrene foam, so the assembly of mask 22b and effectively transparent material 60 may simply be laid atop the foam 10 if of sufficient weight, though to prevent excessive gaps from forming between the mask and foam, it may be useful to adhere the assembly to a lightweight frame under light tension. Polyolefin foams, on the other hand, do become extremely sticky as they collapse, so means must be provided to prevent the transparent material 60 from adhering to the heated foam 10.

One such means is to stretch the transparent material 60 over a rigid frame so as to be able to suspend the assembly above the foam 10 to maintain a narrow gap between the transparent material 60 and the foam 10. A second means is to coat the surface of foam substrate 10 with a removable coating as previously described in conjunction with FIG. 1D, thereby interposing a suitable barrier between foam substrate 10 and transparent material 60. A third means is to cut away large open areas of the transparent material 60, because sagging and sticking is most pronounced in the center of such areas. Because fiberglass tissue is easily cut by a sharp blade, the third is the preferred means in most cases.

Figure 9:
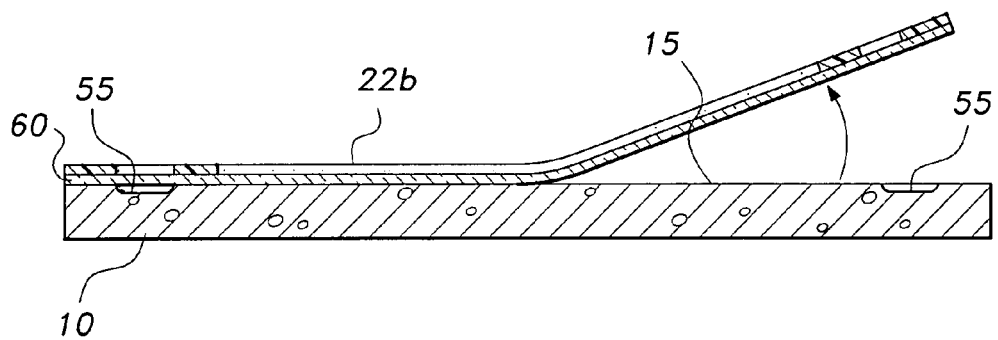
FIG. 9 is a cross section view on line B-B of FIG. 7 of a relief structure formed by the image-wise collapse of foam plastic in unmasked areas, along with a mask-bearing sheet of effectively transparent material which is being removed from the relief structure according to the present invention.

FIG. 9 illustrates in cross-section along line B-B of FIG. 7, the relief structure 55 formed by pattern-wise collapse of foam substrate 10 following radiant energy exposure. It should be noted that the assembly of reflective film mask 22b and effectively transparent material 60 can be removed for possible re-use, as shown by the counter-clockwise arrow.

Figure 10:
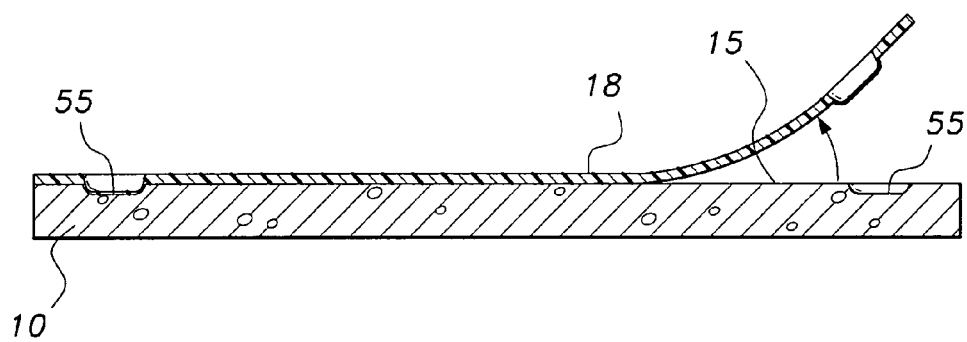
FIG. 10 is a cross section view showing a removable heat-absorbent coating being removed from a foam plastic relief structure.

As shown in FIG. 10, removable coating/film 18 may be peeled or lifted off of relief structure 55, and foam surface 15 in order to reveal surface characteristics such as, e.g., translucency, of the relief structure 55.

I claim:

1. A 3-D relief pattern blank, comprising:
a piece of thermoplastic foam;
a radiant energy retroreflective mask having a shape of a pattern; the radiant energy retroreflective mask being disposed over a surface of the thermoplastic foam piece; and wherein when a radiant energy source is directed at the surface of the pattern blank, portions of the pattern blank not covered by the mask pattern collapse to create a relief of the mask pattern in the thermoplastic foam piece.

2. The 3-D relief pattern blank according to claim 1, wherein the retroreflective mask is a cut pattern of a retroreflective film.

3. The 3-D relief pattern blank according to claim 2, wherein a computer controlled cutting plotter is used to form the cut pattern of the retroreflective film.

4. The 3-D relief pattern blank according to claim 1, wherein the retroreflective mask is in direct contact with the surface of the thermoplastic foam piece.

5. The 3-D relief pattern blank according to claim 1, further comprising: a heat absorbing coating being permanently disposed on the surface of the thermoplastic foam piece.

6. The 3-D relief pattern blank according to claim 5, wherein the permanently disposed heat absorbing coating is an opaque paint.

7. The 3-D relief pattern blank according to claim 5, wherein the permanently disposed heat absorbing coating comprises a sealing coat and a final coat.

8. The 3-D relief pattern blank according to claim 1, further comprising: a heat absorbing coating being removably disposed on the surface of the thermoplastic foam piece, the retroreflective mask being disposed on top of the removable heat absorbing coating.

9. The 3-D relief pattern blank according to claim 8, wherein the removably disposed heat absorbing coating comprises a thin plastic film.

10. The 3-D relief pattern blank according to claim 9, wherein a coat of dark paint is disposed on the thin plastic film.

11. The 3-D relief pattern blank according to claim 9, wherein the thin plastic film is disposed on an extruded polystyrene sheet.

12. The 3-D relief pattern blank according to claim 8, wherein the removably disposed heat absorbing coating is a liquid capable of curing into a coating that can be peeled/washed away following formation of the relief structure.

13. The 3-D relief pattern blank according to claim 12, wherein the liquid coating is a water-soluble paint mixer.

14. The 3-D relief pattern blank according to claim 12 wherein the liquid coating comprises a water-soluble polyvinyl acetate glue mixed with a dark tinting agent.

15. The 3-D relief pattern blank according to claim 1, further comprising: an effectively transparent film being removably disposed over the piece of thermoplastic foam, the retroreflective mask being disposed on top of the transparent film, wherein the assembly of removable transparent film and retroreflective mask can be re-used to produce multiple copies of a pattern.

16. The 3-D relief pattern blank according to claim 15, wherein the removably disposed effectively transparent film is disposed atop the piece of thermoplastic foam.

17. The 3-D relief pattern blank according to claim 15, wherein the removably disposed effectively transparent film is suspended above the piece of thermoplastic foam.

* * * * *